(12) United States Patent
Kuo

(10) Patent No.: US 8,480,893 B2
(45) Date of Patent: Jul. 9, 2013

(54) GRAVITY-FLOW WATER PURIFIER

(75) Inventor: Chi-Chang Kuo, Taichung (TW)

(73) Assignee: New Century Membrane Technology Co., Ltd., Taichung (TW)

( * ) Notice: Subject to any disclaimer, the term of this patent is extended or adjusted under 35 U.S.C. 154(b) by 368 days.

(21) Appl. No.: 13/004,772

(22) Filed: Jan. 11, 2011

(65) Prior Publication Data
US 2012/0175293 A1 Jul. 12, 2012

(51) Int. Cl.
*B01D 27/08* (2006.01)
*B01D 27/14* (2006.01)
*B01D 29/41* (2006.01)
*B01D 33/39* (2006.01)
*B01D 35/027* (2006.01)
*B01D 35/30* (2006.01)

(52) U.S. Cl.
USPC ............ 210/232; 210/236; 210/331; 210/347

(58) Field of Classification Search
USPC ........................... 210/232, 236, 238, 349, 331
See application file for complete search history.

(56) References Cited

U.S. PATENT DOCUMENTS

| | | | | |
|---|---|---|---|---|
| 3,206,031 A * | 9/1965 | Messa | ......................... | 210/172.2 |
| 3,206,033 A * | 9/1965 | Kern, Jr. | ........................ | 210/249 |
| 3,223,619 A * | 12/1965 | Calmon et al. | ................ | 210/667 |
| 3,392,837 A * | 7/1968 | Sanzenbacher | ............... | 210/282 |
| 3,408,295 A * | 10/1968 | Vaichulis | ....................... | 210/753 |
| 3,430,769 A * | 3/1969 | Sanzenbacher | ............... | 210/266 |

* cited by examiner

*Primary Examiner* — Thomas M Lithgow

(57) ABSTRACT

A gravity-flow water purifier includes a treatment tank, a water yielding pipe, a filter unit, and a sliding sleeve unit. The treatment tank includes a tank wall, an insertion hole, a receiving chamber, and at least two slide rails provided on the inner surface of the tank wall. The sliding sleeve unit includes a reticulated frame in which the filter unit is disposed. In addition, at least two sliding blocks are provided on the outer periphery of the frame. The filter unit is installed in a bottom portion of the treatment tank so that a gravity flow through the filter unit is generated by the water level in the treatment tank. Cooperation between the sliding blocks and the slide rails allows the sliding sleeve unit and the filter unit to be easily installed in and removed from the treatment tank, thereby facilitating the cleaning and replacement of filter elements.

10 Claims, 9 Drawing Sheets

GRAVITY-FLOW WATER PURIFIER

BACKGROUND OF THE INVENTION

1. Technical Field

The present invention relates to a water treatment device and, more particularly, to a gravity-flow water purifier whose filtering action need not be driven by electricity and whose filter elements can be conveniently installed, removed, and cleaned.

2. Description of Related Art

In a conventional water filter device, the filter unit is typically placed in a closed housing and submerged in the water to be filtered. Moreover, the water filter device must be connected to an external power source, so a boost pump is electrically driven to raise the water pressure at the water inlet end of the filter unit. The high water pressure urges clean water molecules to pass through a membrane, which nevertheless prevents impurities and harmful substances from passage. Thus, solid-liquid separation is achieved to generate purified water.

While using an external power source to pump water through the filter unit accelerates the filtering process, an electric water filter device gives rise to power consumption concerns and must be used where electricity is available. This presents practical difficulties in less developed areas or areas with low water supply pressure.

As a solution to the aforesaid problem, it has been proven effective to move the feed water tank to a relatively high position, so that the potential energy of feed water and consequently the water pressure at the water inlet end of the filter unit are increased to enable automatic filtering. However, the foregoing arrangement requires additional pipelines and release valves, which is costly and structurally undesirable.

In addition, the filter elements, or filter materials, in a common water filter device are expendable and are usually disposed inside the housing of the water filter device. Therefore, when the filter elements are soiled or blocked and need replacing or cleaning, it is necessary to open the housing and adequately discharge the water therein before the filter unit can be taken out for replacement. The complicated disassembly process not only is time-consuming and laborious, but also can be problematic if the water filter device is a massive machine. This is also an important issue that the filter device industry has been seeking to address.

BRIEF SUMMARY OF THE INVENTION

It is an object of the present invention to provide a gravity-flow water purifier wherein the power required to drive water through the filter unit is provided by raising the water level in the treatment tank. Thus, no electric power is needed to drive the filtering process, and no additional pipelines required for water delivery. As such, the gravity-flow water purifier features a simple structure and a low production cost.

It is another object of the present invention to provide a gravity-flow water purifier wherein a sliding sleeve unit in the treatment tank is so configured that the filter unit can be directly pushed into or drawn out of the treatment tank while the treatment tank is closed. Thus, the filter membrane can be conveniently cleaned, and the filter elements replaced with ease.

To achieve the above and other objects, the present invention provides a gravity-flow water purifier which includes a treatment tank, a water yielding pipe, a filter unit, and a sliding sleeve unit. The treatment tank includes a tank wall, an insertion hole, a discharge hole, and a receiving chamber enclosed by the tank wall. The treatment tank further includes at least two slide rails mounted on the inner surface of the tank wall and corresponding in position to the insertion hole. The water yielding pipe includes a pipe wall surrounding an axis and a plurality of through holes penetrating the pipe wall. The filter unit includes a plurality of filter bags hermetically mounted around the water yielding pipe in a densely packed manner. The filter bags are perpendicular to the axis, and each filter bag has a central hole in communication with the through holes. When the water yielding pipe is driven to rotate, the filter unit is simultaneously rotated about the axis of the water yielding pipe. The sliding sleeve unit includes a reticulated frame. The frame includes at least two sliding blocks provided on the outer periphery of the frame, an interior space, and an opening at one end of the frame.

Once the filter unit is placed in the interior space of the frame of the sliding sleeve unit, the sliding sleeve unit can be inserted into the insertion hole of the treatment tank by sliding the sliding blocks along the slide rails. Thus, the sliding sleeve unit and the filter unit are conveniently installed in, and can later be as conveniently removed from, the receiving chamber of the treatment tank.

The gravity-flow water purifier of the present invention needs no electricity because water is driven through the filter unit by potential energy generated from a high water level in the treatment tank. There is also no need to use additional pipes for water delivery. Hence, the present invention has such advantages as structural simplicity and a low production cost. Furthermore, by placing the filter unit in the sliding sleeve unit which is slidable along the slide rails, the filter unit is allowed easy assembly to and removal from the treatment tank to facilitate the cleaning and replacement of filter elements.

BRIEF DESCRIPTION OF THE SEVERAL VIEWS OF THE DRAWINGS

A detailed description of further features and advantages of the present invention is given below with reference to the accompanying drawings, in which.

DETAILED DESCRIPTION OF THE INVENTION

Figure 1:
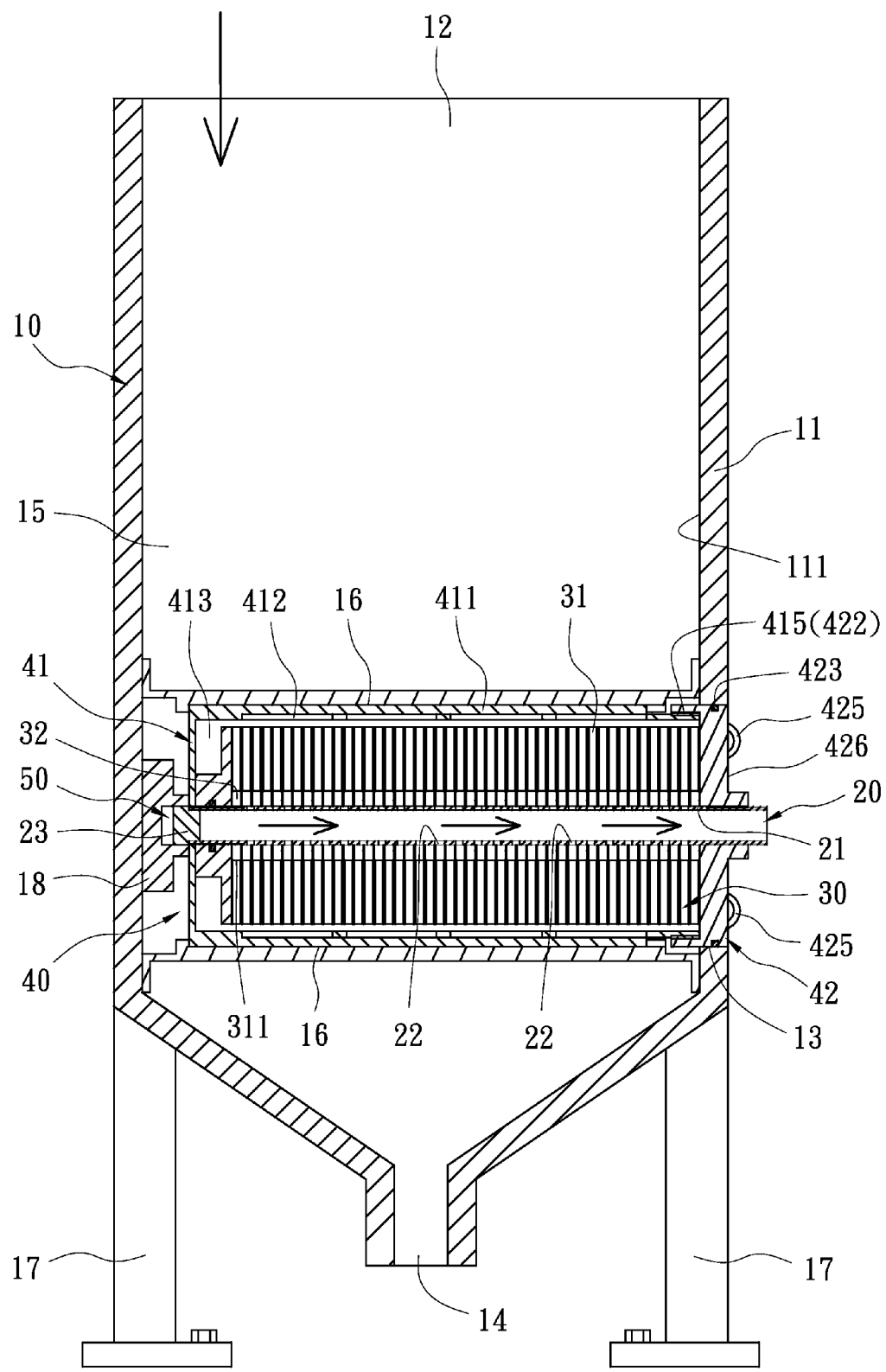
FIG. 1 is an assembled sectional view of a gravity-flow water purifier according to a first embodiment of the present invention.

Referring to FIG. 1, a gravity-flow water purifier according to a first embodiment of the present invention includes a treatment tank 10, a water yielding pipe 20, a filter unit 30, and a sliding sleeve unit 40.

The treatment tank 10 includes a topless funnel-shaped tank wall 11, a water inlet hole 12, an insertion hole 13 formed on a lateral side of the tank wall 11, a discharge hole 14 at the bottom of the tank wall 11, a receiving chamber 15 enclosed by the tank wall 11, and at least two slide rails 16 mounted on the inner surface 111 of the tank wall 11 and corresponding in position to the insertion hole 13. The treatment tank 10 further includes a plurality of legs 17 for supporting the treatment tank 10 stably on the ground or any flat surface.

The water yielding pipe 20 includes a pipe wall 21 surrounding an axis and a plurality of through holes 22 penetrating the pipe wall 21. The water yielding pipe 20 further includes a plug 23 fitted in one end of the water yielding pipe 20. The other end of the water yielding pipe 20 extends out of the treatment tank 10 so that water filtered into the water yielding pipe 20 is guided to a purified water tank (not shown) for storage.

The filter unit 30 includes a plurality of filter bags 31, a plurality of water guiding plates 32, and a plurality of water sealing elements 33, wherein the filter bags 31, each having a central hole 311, are hermetically mounted around the water yielding pipe 20 in a densely packed manner. The water guiding plates 32 are arranged alternately with the filter bags 31 of the filter unit 30, and each two adjacent water guiding plates 32 are engaged with each other to form a unit. More specifically, the peripheral portion of the central hole 311 of each filter bag 31 is sandwiched between two adjacent water guiding plates 32, with the corresponding water sealing elements 33 pressed against the membrane surface of the filter bag 31 to prevent unfiltered water from entering the water yielding pipe 20. The filter bags 31 of the filter unit 30 are sequentially connected in a densely packed manner by virtue of the interlocking feature of the water guiding plates 32.

Figure 2:
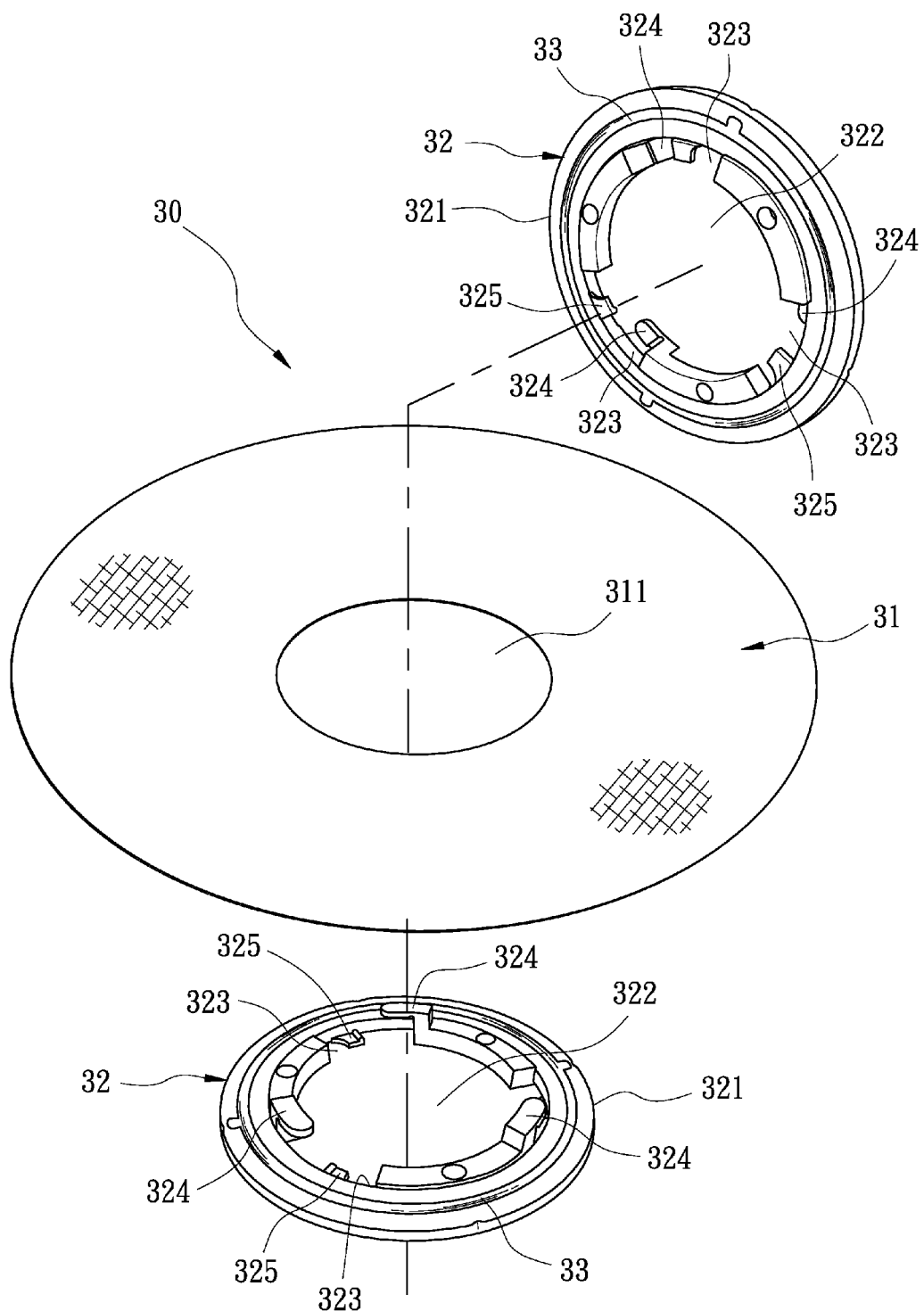
FIG. 2 is an exploded perspective view of the filter unit of the gravity-flow water purifier depicted in FIG. 1.

Referring to FIG. 2, each water guiding plate 32 has a disc-shaped body 321, a through hole 322, three arcuate holes 323, three inverted L-shaped locking portions 324, and three engaging portions 325. The locking portions 324 of each water guiding plate 32 can be inserted respectively into the arcuate holes 323 of an adjacent water guiding plate 32 and be rotated between a released position, in which the locking portions 324 of one of the two adjacent water guiding plates 32 correspond in position to the locking portions 324 of the other water guiding plate 32, and a locked position, in which the locking portions 324 of one of the two adjacent water guiding plates 32 correspond in position to the engaging portions 325 of the other water guiding plate 32. For more details on the structure of the water guiding plates 32, please refer to Taiwan Patent Application No. 099116062, filed by the inventor of the present invention.

Figure 3:
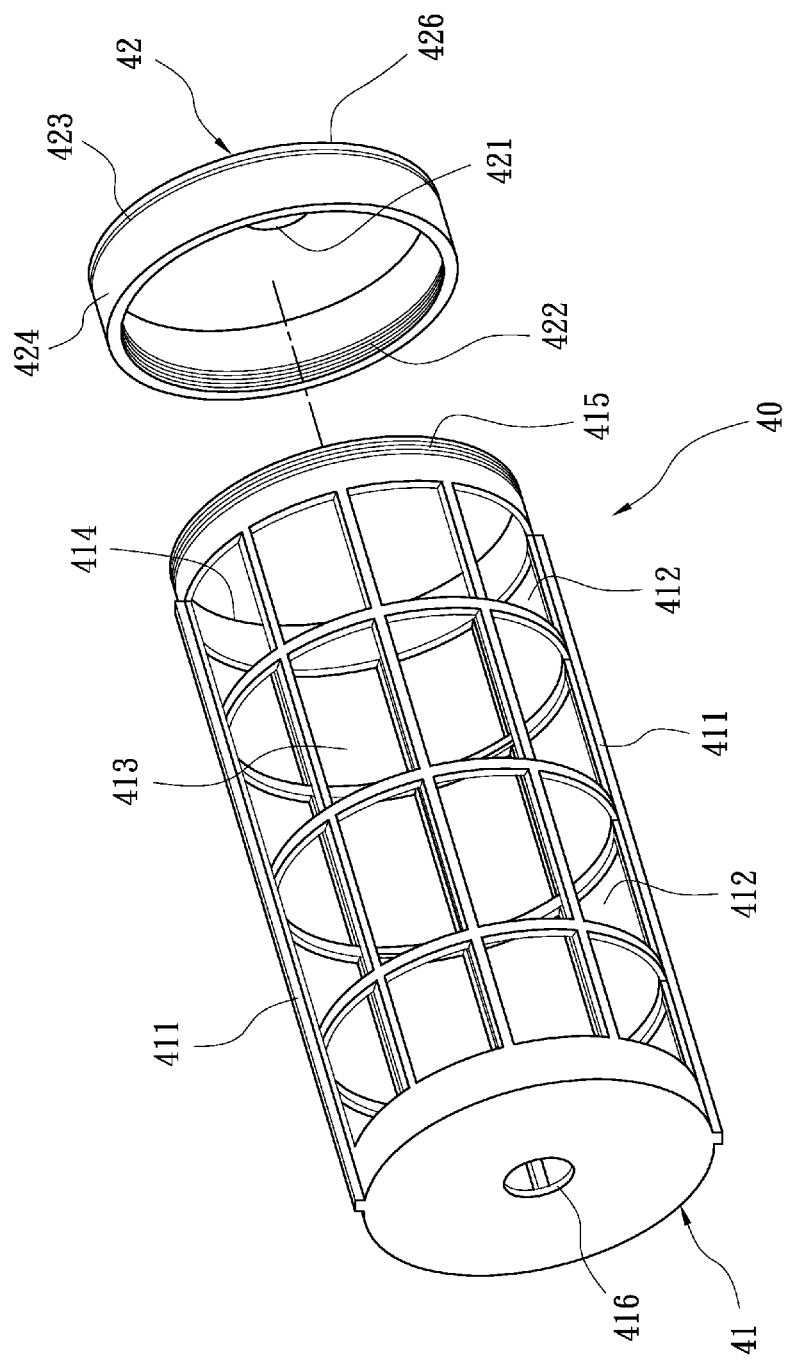
FIG. 3 is an exploded perspective view of the sliding sleeve unit of the gravity-flow water purifier depicted in FIG. 1.

With reference to FIG. 3, the sliding sleeve unit 40 includes a cylindrical reticulated frame 41 and a cap 42. The frame 41 includes at least two sliding blocks 411 provided on the outer periphery of the frame 41, a plurality of apertures 412, an interior space 413, an opening 414, and a first connecting portion 415, the latter two of which are provided at one end of the frame 41. The sliding blocks 411 are protrudingly provided on the frame 41 along an axial direction thereof. The cap 42 has a central hole 421, a second connecting portion 422, and a gasket 423. The second connecting portion 422 of the cap 42 corresponds in position to and is connected with the first connecting portion 415 of the frame 41. The gasket 423 is circumferentially provided on the outer peripheral surface 424 of the cap 42. In addition, the cap 42 of the sliding sleeve unit 40 further includes at least one handle 425 protrudingly provided on the outer surface 426 of the cap 42. The handles 425 are intended to be held by an operator so that the sliding sleeve unit 40 and the filter unit 30 can be easily pushed and pulled. In the present embodiment, the first connecting portion 415 of the frame 41 is an external thread while the second connecting portion 422 of the cap 42 is an internal thread.

The treatment tank 10 further includes a positioning seat 18 provided on the inner surface 111 of the tank wall 11. Meanwhile, the frame 41 of the sliding sleeve unit 40 has an end which is opposite the opening 414 and formed with a through hole 416. Once the filter unit 30 is installed in the interior space 413 of the frame 41 of the sliding sleeve unit 40, the water yielding pipe 20 extends through the through hole 416. When the assembly of the filter unit 30 and the sliding sleeve unit 40 is subsequently installed in the treatment tank 10, the water yielding pipe 20 is pressed against the positioning seat 18 and thereby fixed in place.

The gravity-flow water purifier of the present invention further includes a control valve 50 provided on the positioning seat 18. When the sliding sleeve unit 40 is pressed against the positioning seat 18, the water yielding pipe 20 is in contact with the control valve 50. The contact between the water yielding pipe 20 and the control valve 50 ensures that the sliding sleeve unit 40 and the filter unit 30 are properly installed, and only in this state will an external pump be turned on to pump water into the treatment tank 10.

The gravity-flow water purifier of the present invention is assembled in the following manner. To begin with, the filter unit 30 is inserted through the opening 414 of the sliding sleeve unit 40 into the interior space 413, such that the water yielding pipe 20 passes through the through hole 416 and juts out of the frame 41. Next, the sliding sleeve unit 40 is inserted into the insertion hole 13 of the treatment tank 10. More specifically, the sliding sleeve unit 40 is slid along the slide rails 16 into the receiving chamber 15 of the treatment tank 10; in consequence, the plug 23 at one end of the water yielding pipe 20 is pressed against the control valve 50 on the positioning seat 18. Finally, the second connecting portion 422 of the cap 42 is connected with the first connecting portion 415 of the frame 41, thereby securing the sliding sleeve unit 40 and the filter unit 30 in the receiving chamber 15 of the treatment tank 10. At the same time, the gasket 423 of the cap 42 is tightly engaged with the hole wall of the insertion hole 13 of the treatment tank 10 to prevent leakage.

Figure 4:
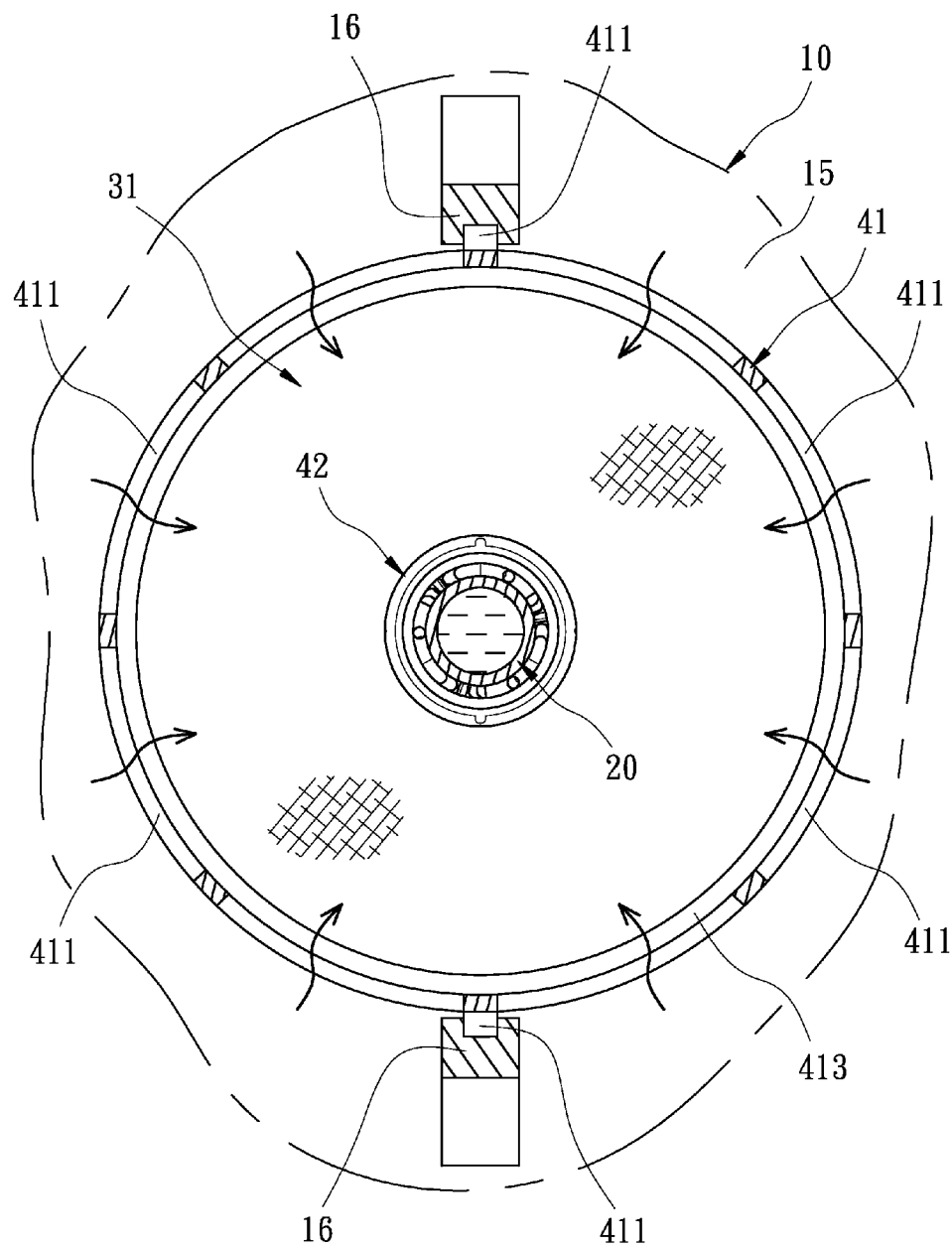
FIG. 4 is a partial sectional view of the gravity-flow water purifier depicted in FIG. 1, showing in particular the engagement between the sliding blocks of the sliding sleeve unit and the slide rails.
Figure 5:
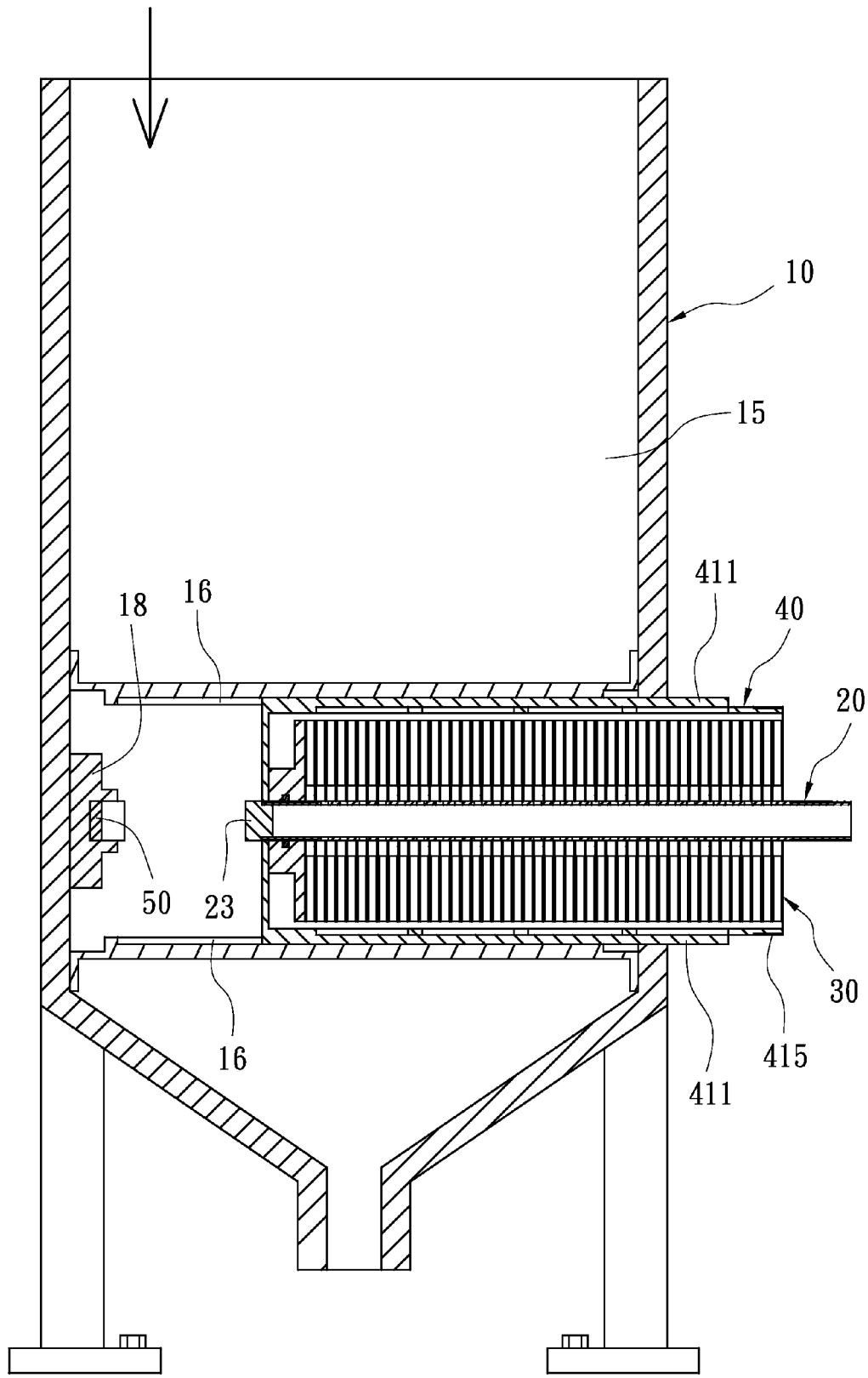
FIG. 5 is another assembled sectional view of the gravity-flow water purifier depicted in FIG. 1, showing the filter unit and the frame of the sliding sleeve unit being drawn out of the treatment tank.

As shown in FIGS. 1, 3, and 4, the cooperation between the sliding blocks 411 of the sliding sleeve unit 40 and the slide rails 16 of the treatment tank 10 facilitates the installation/removal of the filter unit 30 into/from the receiving chamber 15 of the treatment tank 15. Therefore, when the membrane surfaces of the filter bags 31 of the filter unit 30 are soiled or blocked and need to be cleaned or replaced, the filter unit 30 can be conveniently taken out of the treatment tank 10 for cleaning or replacement. Referring to FIG. 5, when it is desired to replace the filter unit 30, the cap 42 is removed, and then the frame 41 is pulled out, together with the filter unit 30 inside, along the slide rails 16. Thus, the filter unit 30 is easily removed from the receiving chamber 15 of the treatment tank 10. In addition, the present invention uses a gravity-flow filtering technique, whereby the feed water in the treatment tank 10 is filtered through the filter bags 31 and becomes clean water. The clean water flows sequentially through the central holes 311 and the through holes 22 and gathers in the water yielding pipe 20, before the clean filtered water is drawn out of the water yielding pipe 20.

According to the above, the filter unit 30 is installed in the sliding sleeve unit 40 so as to be easily assembled into the receiving chamber 15 of the treatment tank 10 via the sliding blocks 411 and the slide rails 16. On the other hand, by holding the handles 425 of the cap 42, an operator can pull out the filter unit 30 and the frame 41 effortlessly and conveniently so that the filter unit 30 can be cleaned or replaced, as shown in FIG. 5. The present invention not only facilitates the replacement of filter elements, but also achieves automatic water feed by means of potential energy generated from the water level in the treatment tank 10. Thus, the filtering process can be carried out in the absence of electricity, making the present invention suitable for use in less developed or remote areas. Moreover, the simple structure of the water purifier of the present invention also reduces the overall production cost.

Figure 6:
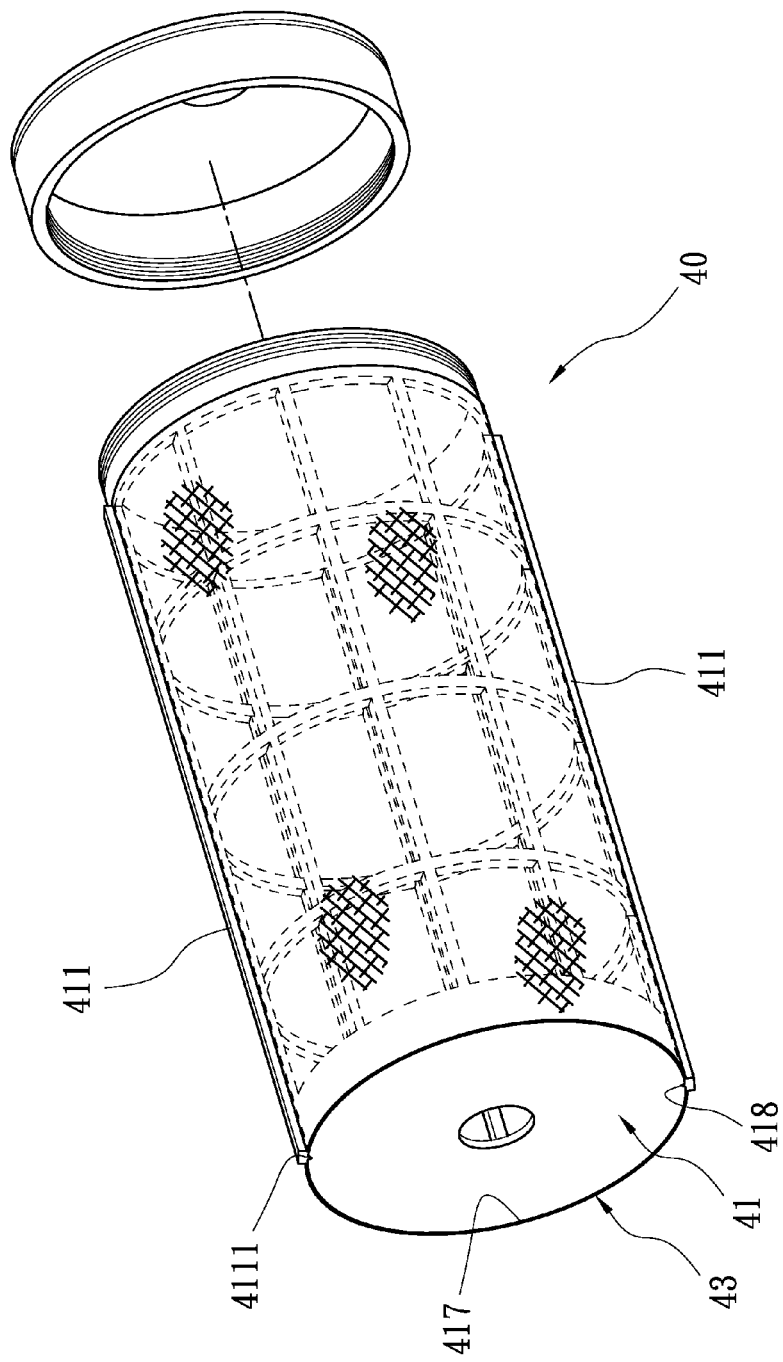
FIG. 6 is an exploded perspective view of another embodiment of the sliding sleeve unit for use in the gravity-flow water purifier depicted in FIG. 1.
Figure 7:
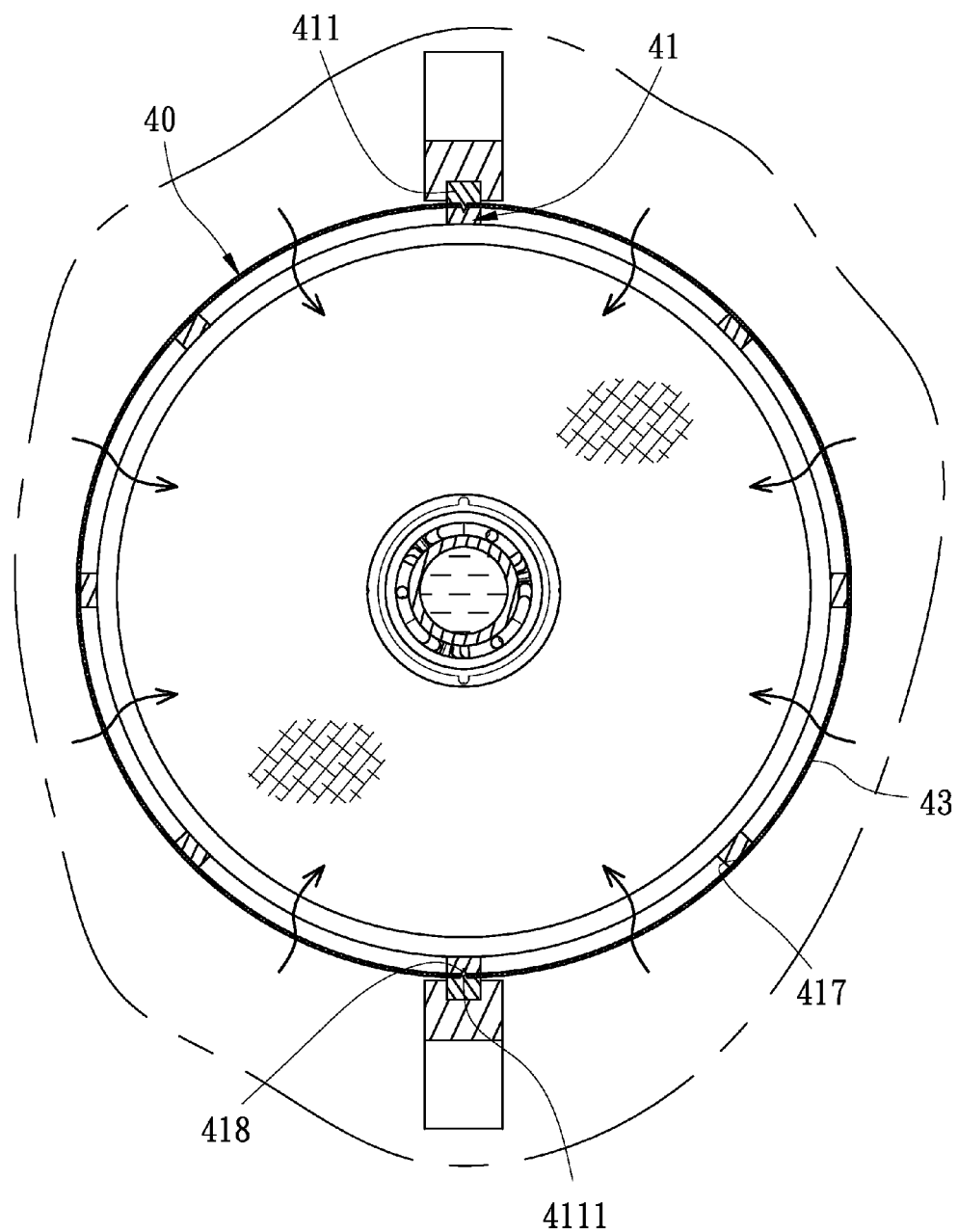
FIG. 7 is a partial sectional view similar to FIG. 4, showing the engaging projections of the sliding blocks of the sliding sleeve unit being engaged with the engaging recesses of the frame while piercing through a filter membrane.
Figure 8:
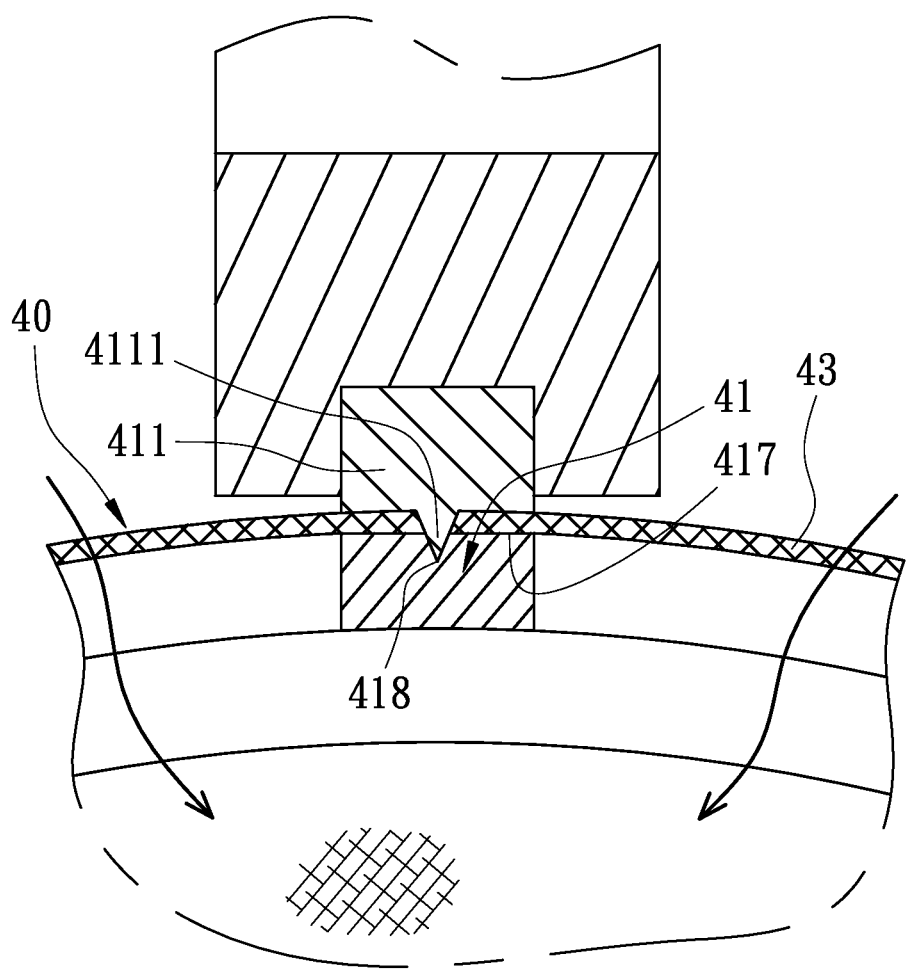
FIG. 8 is a partial enlarged view of FIG. 7, showing in detail the engaging projection piercing through the filter membrane and engaged in the engaging recess.

Referring to FIGS. 6, 7, and 8, the sliding sleeve unit 40 further includes a filter membrane 43 covering the outer peripheral surface 417 of the frame 41 so as to provide a preliminary pre-filtering function. To facilitate installation of the filter membrane 43, the sliding blocks 411 of the sliding sleeve unit 40 are each provided with a conical engaging projection 4111, and the outer peripheral surface 417 of the frame 41 is provided with engaging recesses 418. Installation of the filter membrane 43 begins by covering the outer peripheral surface 417 of the frame 41 with the filter membrane 43. Then, the engaging projections 4111 of the sliding blocks 411 pierce through the filter membrane 43 and are engaged respectively in the engaging recesses 418 of the frame 41. Thus, the filter membrane 43 is secured, and the sliding blocks 411 fixed in place.

Figure 9:
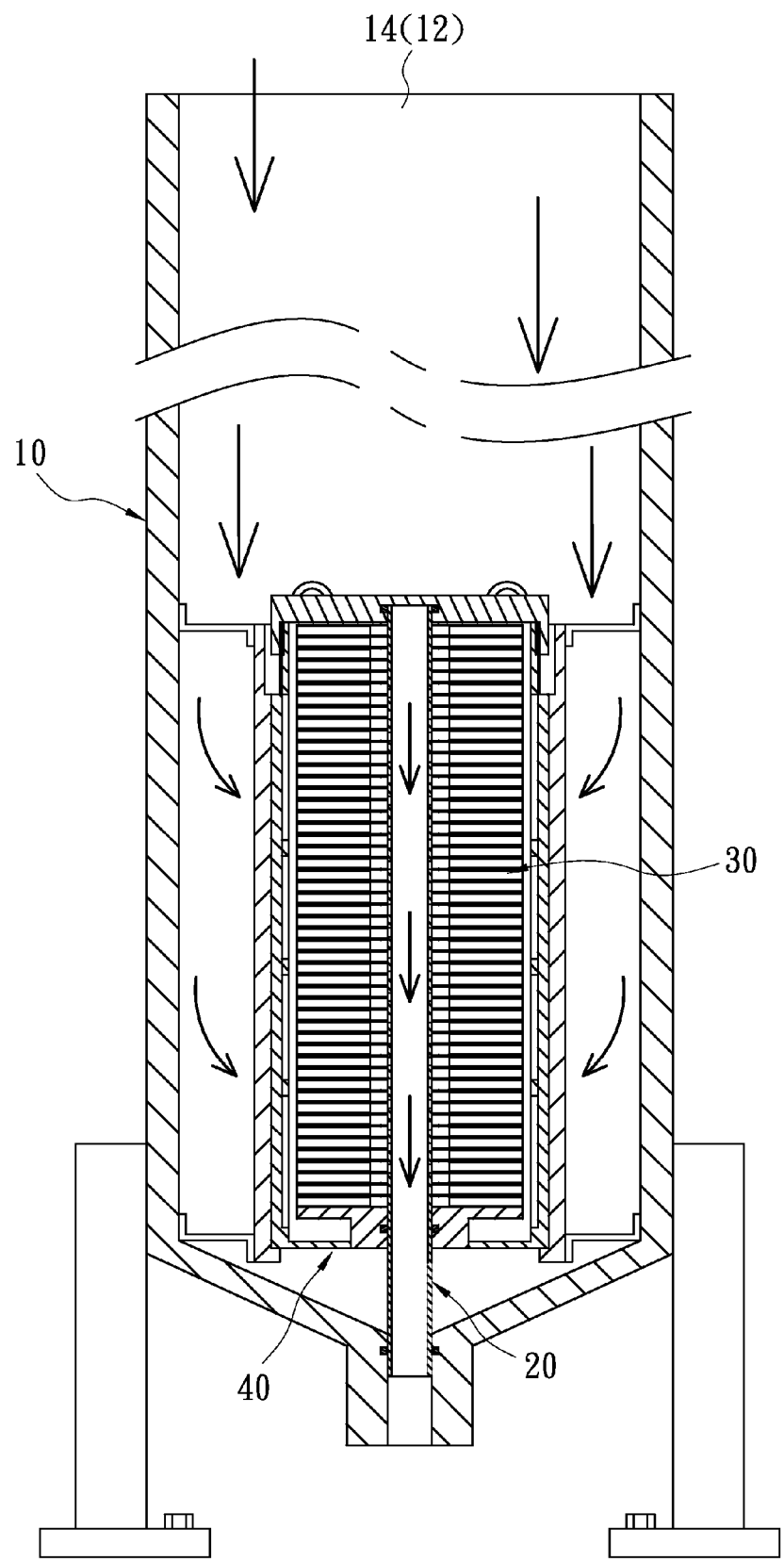
FIG. 9 is an assembled sectional view of a gravity-flow water purifier according to a second embodiment of the present invention, wherein the filter unit is installed in an upright position.

FIG. 9 shows a gravity-flow water purifier according to a second embodiment of the present invention, wherein the gravity-flow water purifier includes a treatment tank 10, a water yielding pipe 20, a filter unit 30, and a sliding sleeve unit 40. The second embodiment is different from the first embodiment in that the filter unit 30 performs its filtering function in an upright position and that the treatment tank 10 is modified in shape correspondingly. Furthermore, the insertion hole 13 in the second embodiment not only serves as an opening through which the filter unit 30 can be installed and removed, but also serves as the water inlet hole 12 of the treatment tank 10. In addition, the control valve 50 in the first embodiment is needed no more in the second embodiment for the gravity-flow water purifier to operate normally. The functions and effects of the second embodiment are the same as those of the first embodiment and hence are not repeated herein.

In a nutshell, the prevent invention provides a gravity-flow water purifier whose filter unit 30 is located in a bottom portion of the treatment tank 10 so that water is automatically fed into the filter unit 30 due to the difference of hydraulic heads in the treatment tank 10. As no electricity is required, the present invention overcomes the power consumption problems of the prior art devices and is therefore applicable to less developed or remote areas. Furthermore, as the filter unit 30 is installed in the treatment tank 10 via a slide rail structure, both installation and removal of the filter unit 30 can be rapidly and conveniently done, and hence the cleaning of the filter membrane 43 and the replacement of filter elements can be carried out easily and effortlessly.

What is claimed is:

1. A gravity-flow water purifier, comprising:
   a treatment tank comprising a tank wall, an insertion hole, a discharge hole, and a receiving chamber enclosed by the tank wall, the treatment tank further comprising at least two slide rails, the slide rails being mounted on an inner surface of the tank wall and corresponding in position to the insertion hole;
   a water yielding pipe comprising a pipe wall surrounding an axis and a plurality of through holes penetrating the pipe wall;
   a filter unit comprising a plurality of filter bags hermetically mounted around the water yielding pipe in a densely packed manner, each said filter bag being perpendicular to the axis and having a central hole in communication with the through holes, wherein when the water yielding pipe is driven to rotate, the filter unit is simultaneously rotated about the axis of the water yielding pipe; and
   a sliding sleeve unit comprising a reticulated frame, the frame comprising at least two sliding blocks provided on an outer periphery of the frame, an interior space, and an opening at an end of the frame;
   wherein after the filter unit is installed in the interior space of the frame of the sliding sleeve unit, the sliding sleeve unit is inserted into the insertion hole of the treatment tank by sliding the sliding blocks along the slide rails, such that the sliding sleeve unit and the filter unit are conveniently installed in and can be easily removed from the receiving chamber of the treatment tank.

2. The gravity-flow water purifier of claim 1, wherein the treatment tank further comprises a positioning seat provided on the inner surface of the tank wall, and the frame of the sliding sleeve unit has an opposite end formed with a through hole, the water yielding pipe passing through the through hole of the frame and being pressed against the positioning seat so as to be fixed in position.

3. The gravity-flow water purifier of claim 2, further comprising a control valve provided on the positioning seat, the water yielding pipe being in contact with the control valve when the sliding sleeve unit is pressed against the positioning seat.

4. The gravity-flow water purifier of claim 1, wherein the sliding sleeve unit further comprises a cap provided with a gasket, the gasket being circumferentially provided on an outer peripheral surface of the cap.

5. The gravity-flow water purifier of claim 1, wherein the frame of the sliding sleeve unit has a plurality of apertures.

6. The gravity-flow water purifier of claim 1, further comprising a filter membrane covering an outer peripheral surface of the frame of the sliding sleeve unit.

7. The gravity-flow water purifier of claim 1, wherein each said sliding block of the sliding sleeve unit has an engaging projection, and the frame has at least two engaging recesses, the sliding blocks being assembled to the frame by engagement between the engaging projections and the engaging recesses.

8. The gravity-flow water purifier of claim 1, wherein the water yielding pipe further comprises a plug fitted in an end of the water yielding pipe.

9. The gravity-flow water purifier of claim 1, wherein the filter unit further comprises a plurality of water guiding plates and a plurality of water sealing elements, the water guiding plates being arranged alternately with the filter bags of the filter unit, each two adjacent said water guiding plates being engaged with each other.

10. The gravity-flow water purifier of claim 1, wherein the sliding sleeve unit further comprises a cap, and the frame has a first connecting portion, the cap having a central hole and a second connecting portion, the second connecting portion of the cap being connected with the first connecting portion of the frame.

* * * * *